(12) United States Patent
Finn

(10) Patent No.: US 7,044,402 B2
(45) Date of Patent: May 16, 2006

(54) MULTI-COMPONENT FLUID MIX RATIO CHECK NOZZLE AND KIT

(76) Inventor: Clifford J. Finn, 2559 N. 91st St., Wauwatosa, WI (US) 53226

( * ) Notice: Subject to any disclaimer, the term of this patent is extended or adjusted under 35 U.S.C. 154(b) by 53 days.

(21) Appl. No.: 10/694,238

(22) Filed: Oct. 27, 2003

(65) Prior Publication Data

US 2005/0087623 A1    Apr. 28, 2005

(51) Int. Cl.
A62C 13/66    (2006.01)
B67D 5/60    (2006.01)
(52) U.S. Cl. ............... 239/302; 239/549; 239/590; 222/145.1; 222/145.3; 222/135; 73/1.16
(58) Field of Classification Search .......... 239/414, 239/432, 600, 574, 527, 549, 390, 302; 222/135, 222/137, 145, 146, 153, 459, 567, 145.1, 222/145.3, 145.4; 604/82, 191; 73/1.16
See application file for complete search history.

(56) References Cited

U.S. PATENT DOCUMENTS

| | | | |
|---|---|---|---|
| 2,380,827 A * | 7/1945 | Downs | 239/113 |
| 2,584,178 A * | 2/1952 | Abbott et al. | 239/414 |
| 2,606,072 A * | 8/1952 | Mantle | 239/414 |
| 4,311,254 A | 1/1982 | Harding | |
| 4,399,930 A | 8/1983 | Harding | |
| 4,428,530 A * | 1/1984 | Chabria | 239/8 |
| 4,458,831 A * | 7/1984 | Holleran et al. | 222/134 |
| 4,516,694 A | 5/1985 | Finn | |
| 4,762,253 A | 8/1988 | Palmert | |
| 4,901,888 A * | 2/1990 | Standlick | 222/145.7 |
| 5,102,016 A * | 4/1992 | Ball et al. | 222/145.3 |
| 5,116,315 A * | 5/1992 | Capozzi et al. | 604/82 |
| 5,197,708 A | 3/1993 | Campau | |
| 5,405,083 A | 4/1995 | Moses | |
| 5,462,204 A * | 10/1995 | Finn | 222/137 |
| 5,992,690 A * | 11/1999 | Tracy | 222/79 |
| 6,345,776 B1 * | 2/2002 | Hurray et al. | 239/413 |
| 6,375,096 B1 | 4/2002 | Rashidi | |
| 6,398,077 B1 * | 6/2002 | Gross et al. | 222/145.1 |
| 6,527,203 B1 | 3/2003 | Hurray et al. | |

* cited by examiner

Primary Examiner—David A. Scherbel
Assistant Examiner—Seth Barney
(74) Attorney, Agent, or Firm—Quarles & Brady LLP

(57) ABSTRACT

A multi-component fluid mix ratio check nozzle includes a base engageable with a multi-component fluid dispensing gun for receiving fluid components dispensed from the gun. At least two hollow extensions extend from the base, wherein each of the extensions provides a passageway for at least one of the components of the multi-component fluid without mixing with the other fluid components of the multi-component fluid. In one embodiment, the mix ratio check nozzle forms part of a kit including a fluid flow adjusting means for adjusting the mix ratio of the fluid components.

3 Claims, 5 Drawing Sheets

MULTI-COMPONENT FLUID MIX RATIO CHECK NOZZLE AND KIT

CROSS REFERENCES TO RELATED APPLICATIONS

Not Applicable.

STATEMENT REGARDING FEDERALLY SPONSORED RESEARCH

Not Applicable.

TECHNICAL FIELD

This invention relates to multi-component fluid dispensing devices, and in particular to a multi-component mix ratio check nozzle and kit for use with a multi-component fluid dispensing gun.

DESCRIPTION OF THE BACKGROUND ART

Manually operable guns are known for dispensing a multi-component fluid, such as a settable urethane foam, adhesive, and the like. Separate fluid components are fed individually to the gun, passed separately through control valves, and brought into contact with each other upon reaching a mixing chamber of a nozzle from which the mixed components are discharged as foam. Examples of such guns are found in U.S. Pat. Nos. 4,311,254 and 4,399,930 issued to Gary Harding, U.S. Pat. No. 4,762,253 issued to Steven H. Palmert, and U.S. Pat. No. 5,462,204 issued to Clifford J. Finn.

In a multi-component, such as a settable urethane foam, the two fluid components are commonly referred to as the "A resin" and the "B resin". They usually consist of polymeric isocyanate and polyol amine, respectively. The components are supplied separately in two pressurized containers that are attached by hoses to inlets to the guns. When the two fluid components, or resins, are mixed, the mixture quickly sets up to form a rigid foam product which is substantially insoluble and extremely difficult to remove from surfaces with which it comes in contact.

The components are typically dispensed through a mixing nozzle. The gun dispenses the fluid components in a predetermined mix ratio, and the mixing nozzle mixes the components to form the multi-component fluid. The mix ratio is the ratio by volume, weight, or some other physical property, that the components of the multi-component fluid are mixed. There are a variety of mixing nozzles available which are designed to completely mix the components and produce the desired multi-component fluid. The proper mix ratio of components, however, can change over time due to the pressure of the individual components or the dispensing temperature of the components, Unfortunately, the dispensing guns do not provide any means for checking to insure the components are being dispensed at the proper mix ratio. Moreover, even if a user could determine the mix ratio of the components being dispensed, if the mix ratio is incorrect, the prior art guns do not have any means for adjusting the mix ratio.

SUMMARY OF THE INVENTION

The present invention provides a multi-component fluid mix ratio check nozzle. The mix ratio check nozzle includes a base engageable with a multi-component fluid dispensing gun to capture fluid components of said multi-component fluid dispensed from the gun. At least two hollow extensions extend from the base, wherein each of the extensions provide a passageway for at least one of the components of the multi-component fluid without mixing with the other components of the multi-component fluid. In one embodiment, the mix ratio check nozzle forms part of a kit including a fluid flow adjusting means for adjusting the mix ratio of the fluid components.

A general objective of the present invention is to a user with the ability to check the mix ratio of fluid components produced by a multi-component fluid dispensing gun. The objective is accomplished by providing a multi-component fluid mix ratio check nozzle that is engageable with a multi-component fluid dispensing gun to prevent the fluid components from mixing in order to determine the mix ratio produced by the multi-component fluid dispensing gun.

Another objective of the present invention is to provide a user with the ability to adjust the mix ratio of fluid components produced by a multi-component fluid dispensing gun. This objective is accomplished by providing means for adjusting the flow of at least one fluid component flowing through the multi-component fluid dispensing gun.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
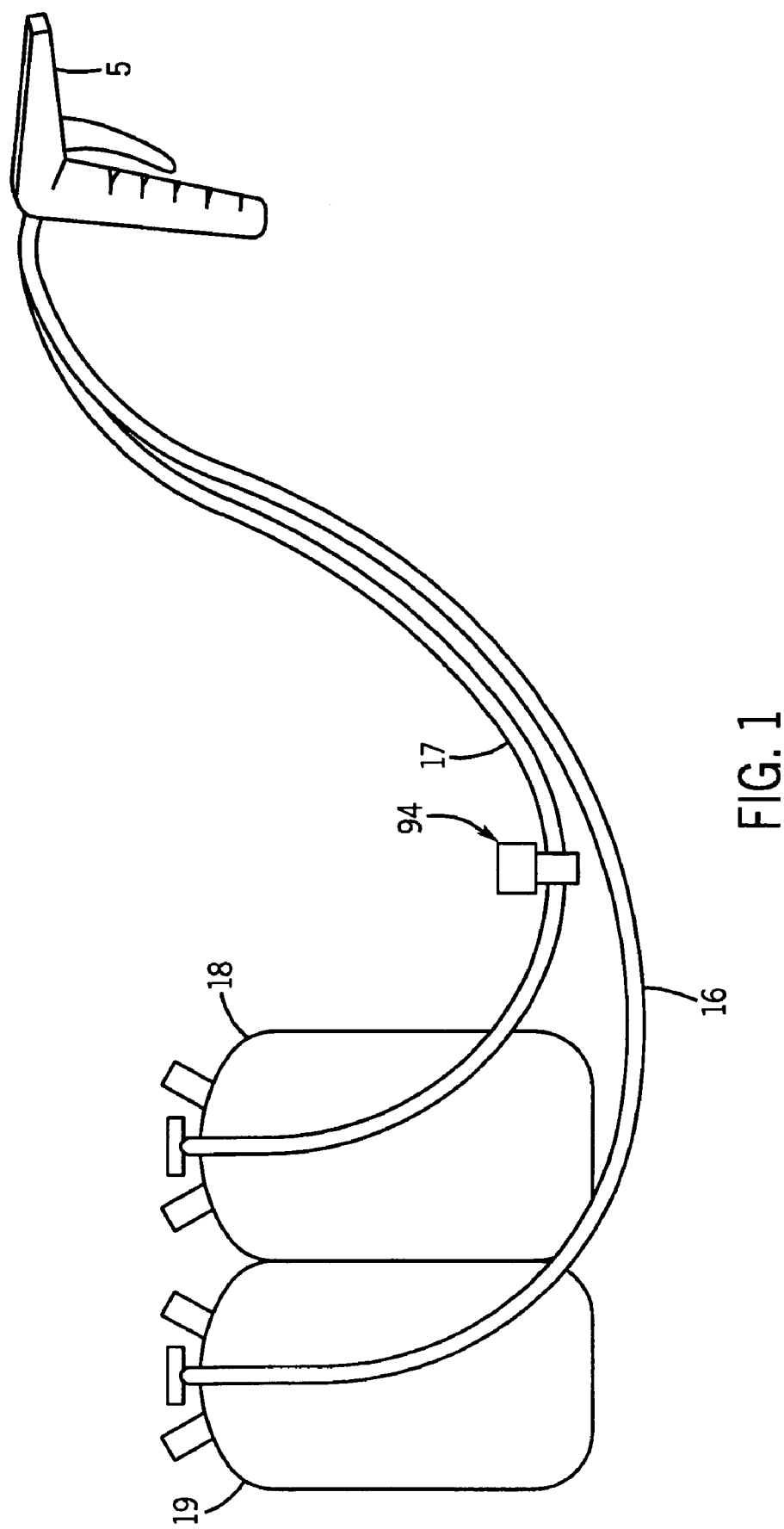
FIG. 1 is a perspective cut away view of a two component fluid dispensing system including a kit incorporating the present invention.
Figure 2:
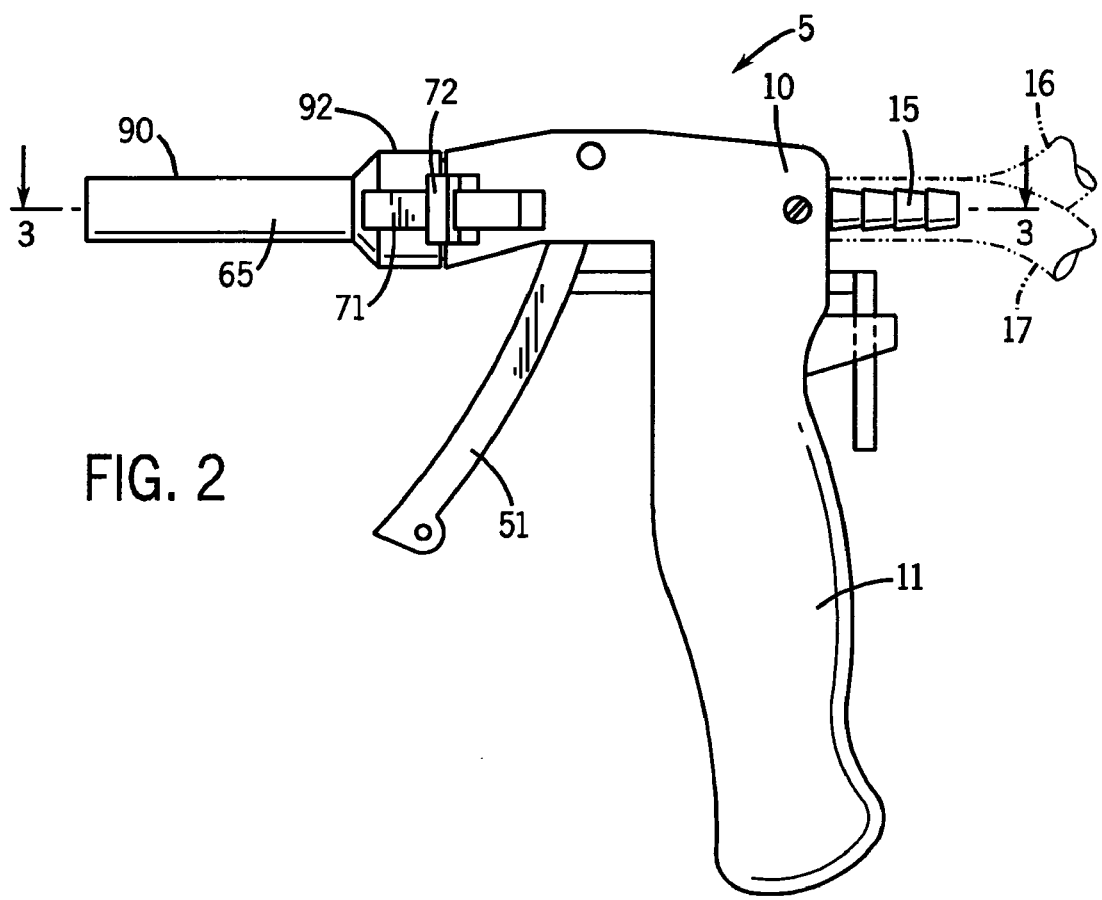
FIG. 2 is a view in elevation of the two component fluid dispensing gun of FIG. 1.

Referring to FIGS. 1–4, in general, a multi-component fluid dispensing gun 5 includes a body 10 with a handle 11 that may be formed integral with the body 10. The body 10 and handle 11 may be molded from a synthetic resin material. The body 10 is formed with a pair of longitudinal, parallel passageways 12 and 13. The passageways 12 and 13 are divided into forward and rearward portions by an intermediate chamber 14. The rearward portions of the passageways 12 and 13 mount brass connectors 15 that have a ribbed end for attachment to hoses 16, 17 connected to pressurized containers 18, 19 for fluid components that are used to form a multi-component fluid, such as a foam, adhesive, and the like. Each hose 16, 17 supplies one of the fluid components which flows through one of the passageways 12, 13.

The connectors 15 are hollow and define passageway inlets leading from the containers 18, 19 of components. The bushings 22 are also hollow and mount duck-bill valves 25 in their center. The duck-bill valves 25 are formed of a rubber or other elastomeric material and function as one-way valves to permit fluid under pressure to enter a passageway 12 or 13.

Each bushing 22 is disposed against a bellville spring 26 which bears against an end of the respective connector 15 thereby urging the bushing 22 inwardly in the passageway 12 or 13 until it abuts against a shoulder 27. A coiled spring 30 is disposed in each of the passageways 12 and 13. The spring 30 bears at one end against an end of a respective bushing 22. The other ends of the springs 30 bear against the ends of brass needle valve members 31 also disposed in the passageways 12 and 13.

The needle valve members 31 span the chamber 14 and are received in both the forward and rearward portions of the passageways 12 and 13. The needle valve members 31 have a rear portion provided with a radial recess 32 that mounts an O-ring 33 to seal with the rearward portion of the passageway 12 or 13. The forward portion of each valve member 31 is formed as a conical needle valve portion 35 terminating in a circular cylindrical tip 36. The conical needle valve portion 35 and tip 36 mate with a conical valve seat 37 having a circular cylindrical extension 38 and formed in the body 10 at the front terminus of the passageways 12 and 13.

Figure 4:
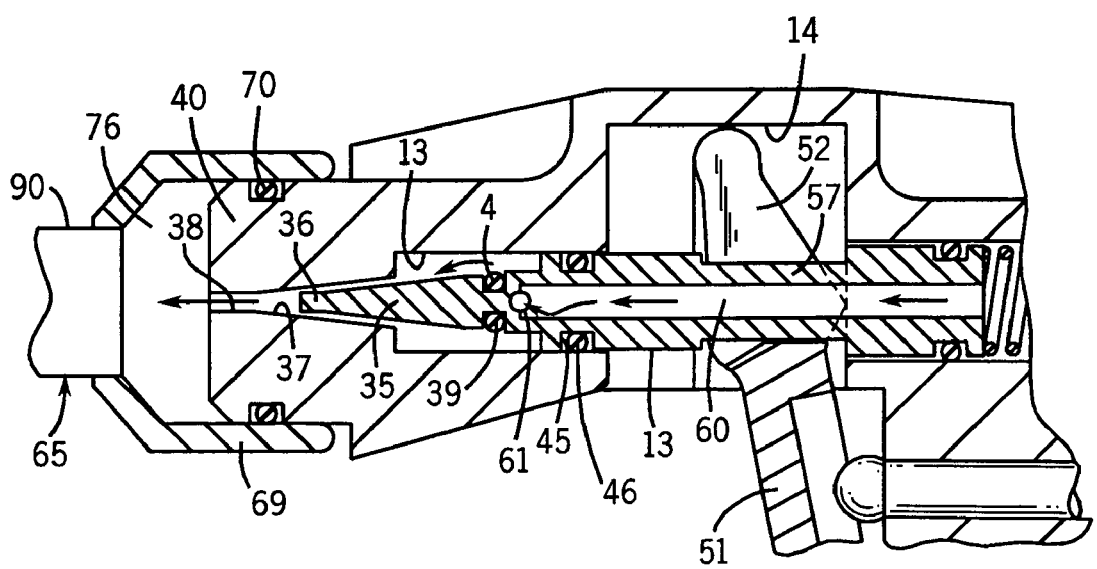
FIG. 4 is a detailed partial view in vertical section taken in the plane of the line 4—4 in FIG. 3 showing the valve members in an open position.
Figure 3:
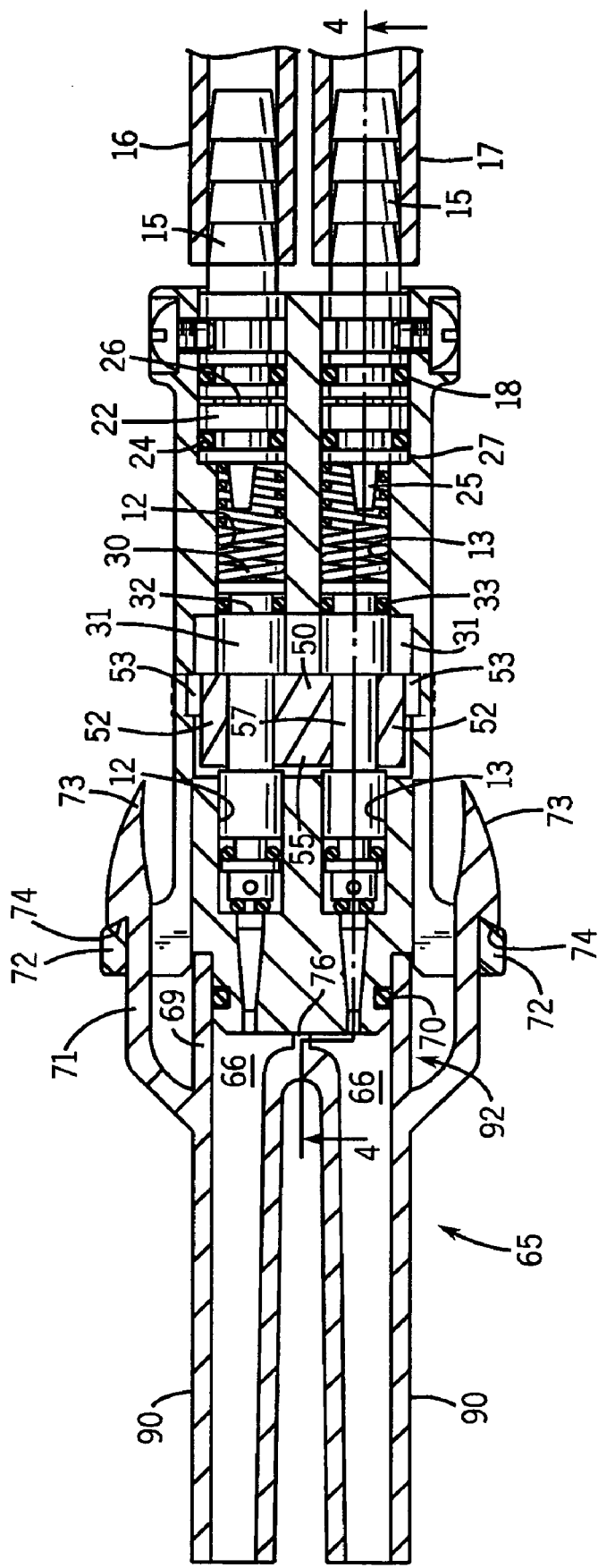
FIG. 3 is a view in horizontal section taken in the plane of the line 3—3 of FIG. 2.
Figure 5:
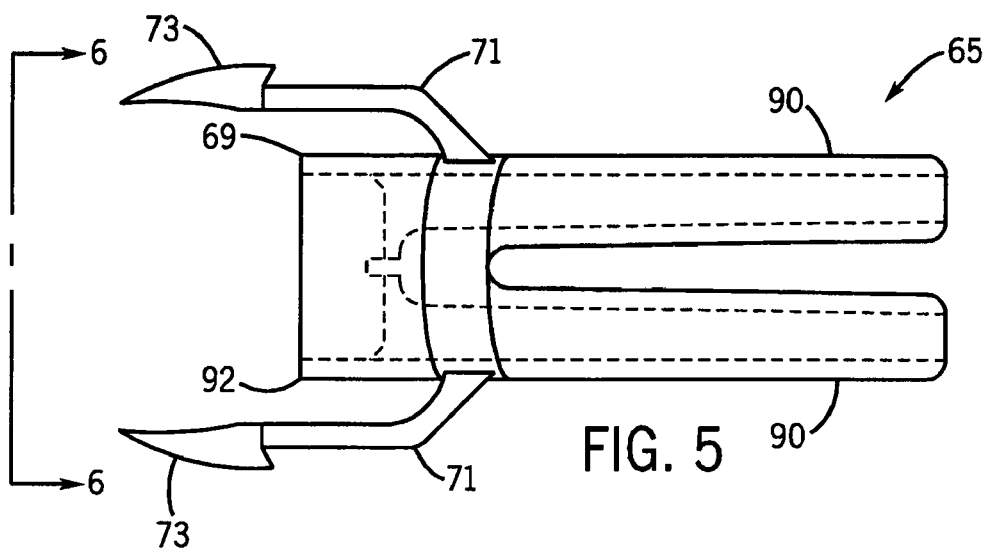
FIG. 5 is a detailed view of the mix ratio check nozzle detachably fixed to the two component fluid dispensing gun of FIG. 1.
Figure 6:
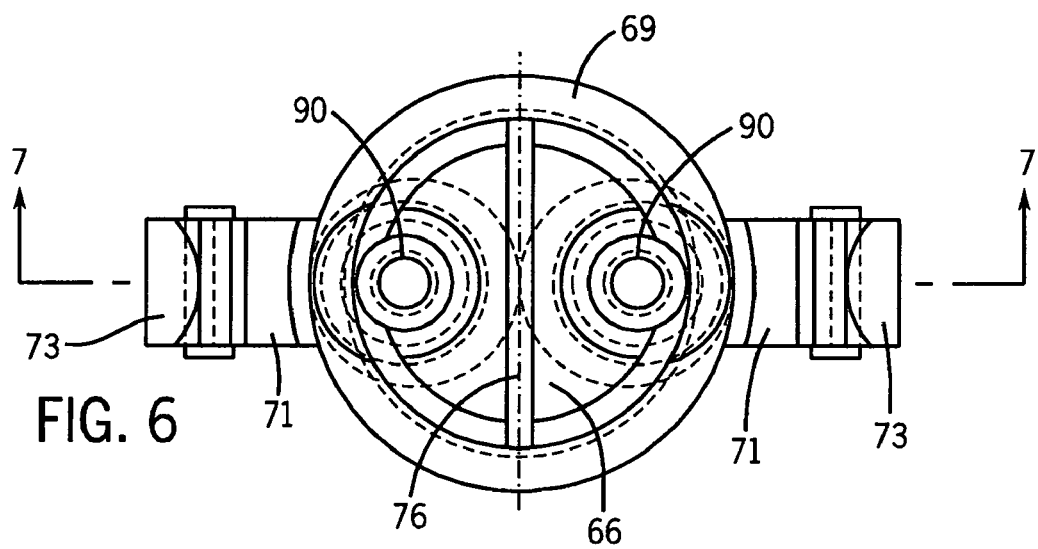
FIG. 6 is an end view along line 6—6 of FIG. 5.
Figure 7:
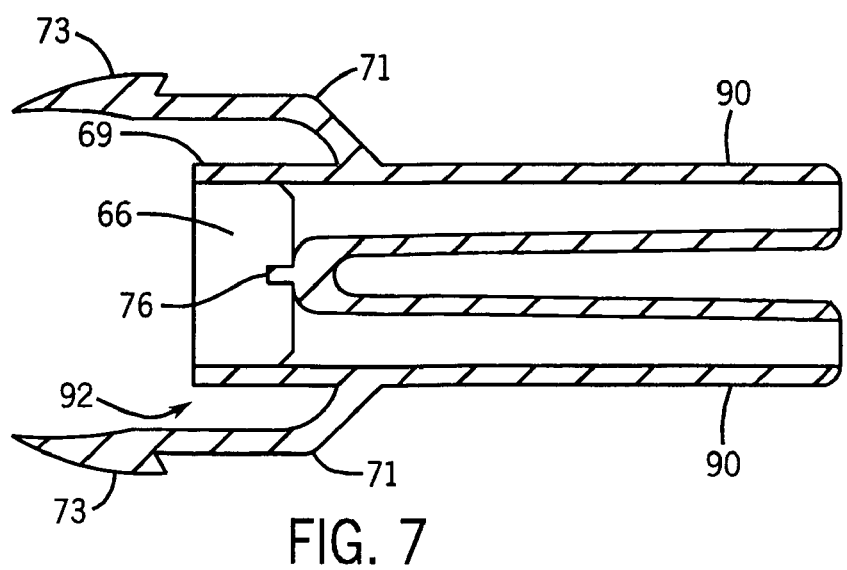
FIG. 7 is a cross sectional view along line 7—7 of FIG. 6.

The valve seats 37 define passageway outlets, and open directly through the front face of a nose 40 on the body 10. The valve members 31 have an annular recess 39 behind the conical needle valve portion 35. The recess 39 mounts an O-ring 41 that seals the junction of the needle valve portion 35 and the conical valve seat 37 when the valve is closed, as shown in FIG. 4. The valve members 31 have an additional annular recess 45 that mounts an O-ring 46 that seals with the forward portions of the passageways 12 and 13.

The chamber 14 mounts a yoke 50 formed at the top of a trigger lever 51. The yoke 50 has a pair of arms 52 terminating in lateral bosses 53 that are received for pivotal movement in holes 54 in the two sides of the body 10, as shown in FIG. 4. The yoke 50 also includes a central rib 55 which, with the arms 52, defines two spaced cradles 56 that receive necked down portions 57 intermediate the ends of the valve members 31. The springs 30 normally urge the valve members 31 forwardly to close the needle valves 35 against the valve seats 37. The trigger lever 51 can be rotated to withdraw the valve members 31 against the urgings of the springs 30 to open the valves formed by the needle valve members 31 and valve seats 37.

Each valve member 31 has a central internal passage 60 that terminates in a transverse port 61 that extends to the surface of the valve member at a point between the O-rings 40 and 46. As shown in FIG. 4, when the trigger lever 51 is squeezed to open the valves, fluid from the pressurized containers can pass through the central passages 60 in the valve members 31, out the ports 61, through the valve seats 37, and out of the front nose 40 of the body 10. The O-rings 46 prevent fluid from moving rearwardly along the passageways 12 or 13. As the valves are closed, the conical needle valve portions 35 will extrude materials forwardly out of the valve seats 37. The seating of the needle valve portion 35 in the valve seat 37 combined with the O-rings 40 will seal off the interior of the passageways 12, 13 and prevent air from reaching the fluid resins in such passageways 12, 13.

The multi-component fluid dispensing gun 5 disclosed above is substantially identical to the foam dispensing gun disclosed in U.S. Pat. No. 5,462,204 with the exception that it includes, as described below, a detachable mix ratio check nozzle for checking the mix ratio of the fluid components of the multi-component fluid dispensed by the nozzle and a means for adjusting the mix ratio. U.S. Pat. No. 5,462,204 is fully incorporated herein by reference. Although the multi-component fluid dispensing gun disclosed herein is preferred, any multi-component fluid dispensing gun that can accommodate a detachable nozzle can be used without departing from the scope of the invention.

As shown in FIGS. 2–7, the disposable mix ratio check nozzle 65 is mounted on the front of the gun 5 which prevent the fluid components from mixing in order to check the mix ratio of the fluid components dispensed by the gun 5. The nozzle 65 includes a pair of tubular extensions 90 extending from a base 92. Each extension 90 is in fluid communication with one of the passageways 12, 13 formed through the gun 5, and has an inlet and an outlet. Preferably, the nozzle 65 is molded from a reinforced plastic, such as a glass filled nylon.

The base 92 of the nozzle 65 upstream of the extensions 90 includes an enlarged circular cylindrical portion 69 which surrounds the nose 40 of the body 10 and is sealed thereto by an O-ring 70. The cylindrical portion 69 defines an inlet chamber 66 upstream of the extensions 90. A wall 76 extends from between the extensions 90 through the inlet chamber 66, and abuts the gun body 10 between the valve seats 37 to prevent the fluid components exiting the passageways 12, 13 from mixing as they pass through the inlet chamber 66 into the respective extensions 90. Advantageously, the base 92 fixes the extensions 90 relative to each other for receiving the fluid components dispensed by the gun 5.

Each extension 90 is, preferably, a hollow tube formed as an integral part of the base 92, and is in fluid communication with one of the gun passageways 12, 13. Advantageously, the extensions 90 guide the fluid components away from the gun 5, and maintain separation of the components in order to fill individual containers (not shown) with the individual components dispensed through the extension outlets. The physical properties, such as weight, volume, and the like, of the fluid components in the individual containers can then be measured to determine the mix ratio of the multi-component fluid dispensed by the gun 5. Although each extension 90 is shown as a rigid tube having smooth exterior sides, the extensions 90 can include external ribs for attaching flexible hoses 96 to simplify filling the individual containers. Although a pair of extensions 90 is disclosed for receiving two fluid components of the two-component fluid, the nozzle can have any number of extensions equal to the number of fluid components of a multi-component fluid without departing from the scope of the invention.

A pair of resilient arms 71 extend along either side of the nozzle rearwardly from the enlarged cylindrical portion 69. The resilient arms 71 are adapted to engage ears 72 that extend from opposite sides of the body 10 adjacent the nose 40. The resilient arms 71 have a curved portion 73 adjacent their ends which terminates in a notch 74 that mates with an ear 72. The nozzle can be quickly attached to the body 10 by sliding the resilient arms 71 beneath the ears 72. The curved portions 73 will cam the arms 71 so that the arms will slide easily past the ears 72 until the notches 74 engages with the ears 72. The nozzles 65 can be easily removed by manually depressing the curved ends 73 of the arms 71 to release the notches 74 from the ears 72 and allow the arms 71 to slide past the ears 72. Although detachably fixing the nozzle 65 to the body 10 is preferred, as described above, the nozzle 65 can be detachably fixed to the body 10 using other methods, such as by using a threaded engagement, snap fit, friction fit, fasteners, and the like, without departing from the scope of the invention. Moreover, the nozzle 65 can be held against the gun body 10 by the user without fixing the nozzle 65 to the body 10 at all without departing from the scope of the invention.

Referring back to FIGS. 1–4, the mix ratio of the fluid components can be controlled by a clamp 94, such as a tubing pinch valve device disclosed in U.S. Pat. No. 5,197,708 which is fully incorporated herein by reference, fixed to one of the hoses 17. The clamp 94 is tightened to restrict the flow of the component through the hose 17 which alters the mix ratio by reducing the volume of the component that flows through the clamped hose 17 without altering the volume flowing through the unclamped hose 16. As a result, the mix ratio of the two components change because the volume of the component flowing through the unclamped hose 16 remains unchanged while the volume of the component flowing the clamped hose 17 is reduced. Of course, if required to accomplish the desired mix ratio, the clamp 94 can be loosened to unrestrict the flow through the clamped hose 17 in order change the mix ratio of the fluid components flowing through the gun passageways 12, 13. Providing a fluid flow adjusting means, such as the clamp 94 on the single hose 17 is preferred because of its simplicity and ease of retrofitting existing multi-component fluid dispensing guns. However, a clamp can be provided on each hose supplying a fluid component to the gun and other fluid flow adjusting means can be provided, such as valves disposed in the flow path of one or more of the passageways, as described below, to independently control the flow of fluid through each passageway without departing from the scope of the invention.

In use, the mix ratio of the components comprising the multi-component fluid is checked by engaging the mix ratio check nozzle 65, such that the extensions 90 are in fluid communication with the nozzle passageways 12, 13. The gun trigger lever 51 is then actuated to allow fluid components through the passageways 12, 13. The fluid components are directed by the mix ratio check nozzle 65 into separate containers, such as bottles, plastic bags, and the like. Physical properties, such as volume, weight, and the like, of the individual fluid components are then measured to determine the mix ratio of the components when they are dispensed through the gun 5 and mixed, such as by a mixing nozzle. If the mix ratio is unacceptable, the clamp 94, or other fluid flow adjusting means, is adjusted to increase or decrease the flow of component fluid through the hose 17 to change the mix ratio as required.

Figure 8:
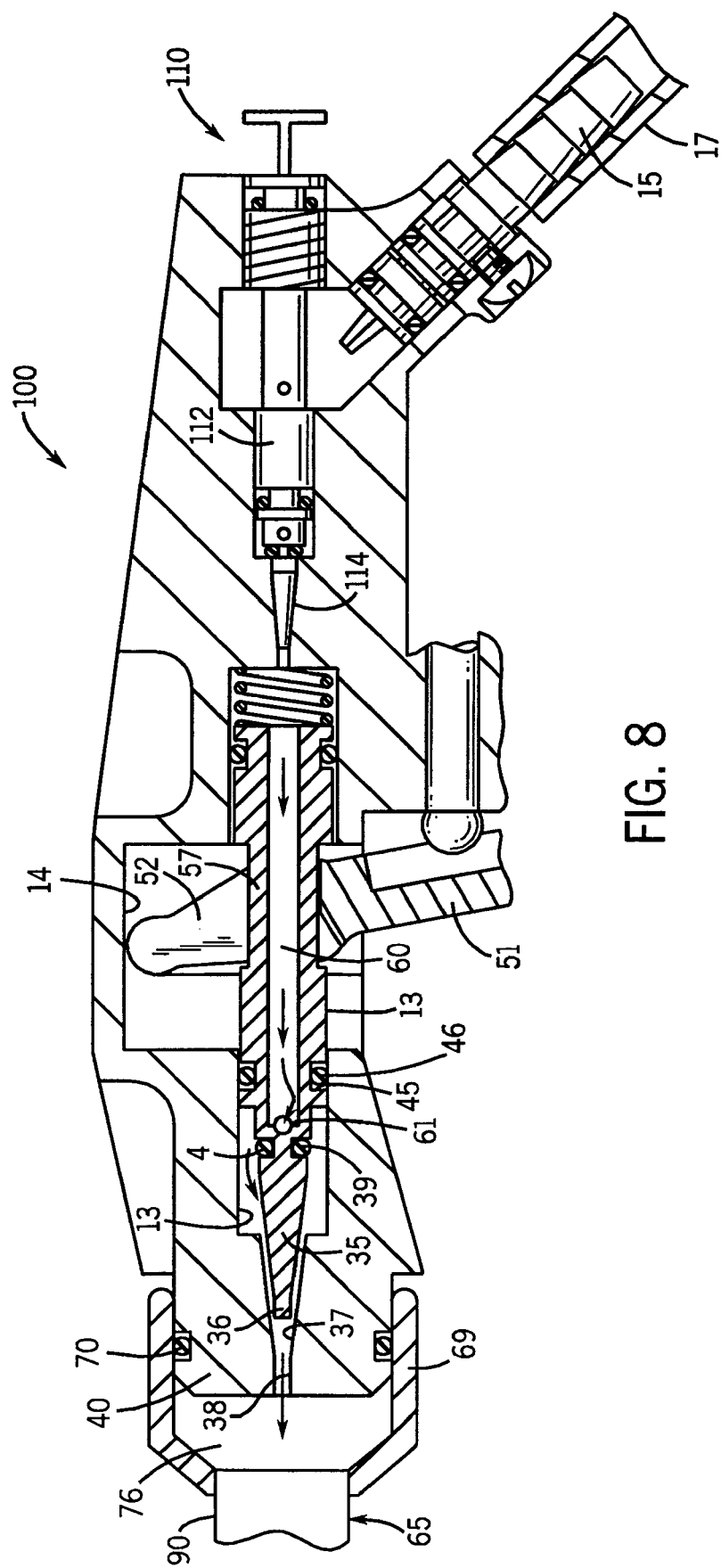
FIG. 8 is an alternative embodiment of a multi-component fluid dispensing system incorporating the present invention.

In an alternative embodiment shown in FIG. 8, a multi-component fluid dispensing gun 100 is shown in which reference numbers used above to describe components of gun 5 are used to designate like component of gun 100. In the gun 100 disclosed in FIG. 8, a mix ratio check nozzle 65 is detachably fixed to the gun 100. Fluid flow adjusting means in the embodiment disclosed in FIG. 8 includes a needle valve 110 disposed in each passageway (only passageway 13 is shown). The needle valve 110 controls the flow of fluid component flowing through the passageway 13 independent of the flow of the other fluid component flowing through the other passageway 12 in order to adjust the mix ratio of the fluid components dispensed by the gun 100.

The needle valve 110 includes a valve member 112 that threadably engages the gun body 10 to axially move the valve member 112 relative to a valve seat 114 and adjust the flow of fluid component flowing through the passageway 13. Although, a needle valve 110 is disclosed, any type of valve, such as a ball cock, screw valve, and the like, disposed in the flow path of one of the fluid components can be used without departing from the scope of the invention.

The mix ratio check nozzle 65 disclosed herein provides a user with the ability to easily check the mix ratio of the fluid components dispensed by the gun 5 in the field to determine whether the gun 5 is operating properly, or whether the conditions under which the gun 5 is operating produces the correct mix ratio. Moreover, the fluid flow adjusting means disclosed herein provides the user with the ability to adjust the mix ratio of the fluid components if the mix ratio is determined to be unacceptable.

While there has been shown and described what is at present considered the preferred embodiment of the invention, it will be obvious to those skilled in the art that various changes and modifications can be made therein without departing from the scope of the invention defined by the appended claims.

The invention claimed is:

1. A kit for use with a multi-component fluid dispensing gun, wherein said gun dispenses two or more components through passageways formed through the gun at a particular mix ratio to form a multi-component fluid, said kit comprising:
   a multi-component fluid mix ratio check nozzle engageable with the multi-component fluid dispensing gun for receiving the fluid components from the passageways, said nozzle including a base engageable with the multi-component fluid dispensing gun, and at least two hollow extensions extending downstream from said base, wherein at least one of said extensions provides a passageway which dispenses at least one of the fluid components of the multi-component fluid without mixing with the other fluid components of the multi-component fluid in order to determine the mix ratio of the fluid components dispensed by the gun;
   a flexible hose in fluid communication with said at least one of said extensions to simplify filling a container with said at least one of the fluid components of the multi-component fluid without mixing with the other fluid components; and
   means for adjusting the flow of at least one of the fluid components dispensed from the gun to alter the mix ratio of the fluid components dispensed from the gun.

2. The kit as in claim 1, in which said means is a tubing pinch valve clamped onto a tube in fluid communication with one of the passageways, wherein the tube feeds one of the fluid components to the one of the passageways.

3. The kit as in claim 1, in which said means is a valve disposed in one of the passageways of the gun.

* * * * *